United States Patent [19]

Walker

[11] Patent Number: 4,625,949
[45] Date of Patent: Dec. 2, 1986

[54] OXYGEN-FUEL WELDING AND CUTTING CABINET ASSEMBLY

[76] Inventor: James A. Walker, 337 Westover, Clarksdale, Miss. 38614

[21] Appl. No.: 757,327

[22] Filed: Jul. 22, 1985

[51] Int. Cl.⁴ .............................................. B23K 7/00
[52] U.S. Cl. .................................. 266/48; 280/47.19; 280/47.26; 312/209
[58] Field of Search .......................... 266/48; 312/209; 280/47.26, 47.19

[56] References Cited

U.S. PATENT DOCUMENTS

3,228,452  1/1966  Watterson .............................. 266/48
4,573,665  3/1986  Strohl et al. .......................... 266/48

Primary Examiner—Wayland Stallard
Attorney, Agent, or Firm—Rogers, Howell, Moore & Haferkamp

[57] ABSTRACT

An oxygen-fuel welding and cutting assembly, and medical assembly, with regulators which comprise control valves with flow rate dials and pressure dials, a cabinet which can be mounted to a cart for oxygen and fuel tank cylinders, the cabinet has mounts for rigidly supporting the regulators within the cabinet, the cabinet has passageways permitting hoses from the oxygen and fuel cylinders to extend therethrough and be connected to the regulator inputs, and to allow passage of hoses connected to the regulator outputs so that the hoses can be wrapped around cart hose mounts and then extend through a cabinet passageway to be connected to a torch body releasably mounted within the cabinet, the cabinet has mounts for holding torches and torch tips, the cabinet has a movable door which allows the torch body to be pulled thereout, when the torch body is moved to an operation site the torch body hoses are pulled through their cabinet passageway and out the cabinet door, the cabinet has a screened section permitting viewing of the regulator dials and permitting dispersion of any leaked gas within the cabinet, the cabinet thus provides a secure structure when the door is locked, the cabinet is mounted to the cart at a height to block objects that might strike the cylinder valves, the assembly further has a lifting rod slidably and detachably mounted to the cart to rotate relative thereto, with a lifting eye detachably mounted to the rod.

23 Claims, 8 Drawing Figures

FIG. 3.

OXYGEN-FUEL WELDING AND CUTTING CABINET ASSEMBLY

FIELD OF THE INVENTION

This invention pertains to oxygen and fuel welding and cutting processes, and supply. Heretofore, oxygen and fuel such as acetylene, propane, propylene, mapp, and other gaseous fuels, have been used in combination for the welding and cutting of metals. Typically, oxygen has been provided in one cylinder tank and the fuel such as acetylene has been provided in another cylinder tank, with each of the cylinders having a manually operated valve and a nozzle atop the cylinder. Regulators have in turn been detachably mounted to the cylinder valves, as by being threaded thereon. The regulators typically comprise a manual valve which controls the flow rate through the regulator, as well as a pressure gauge dial, and a flow rate dial to measure the flow through the regulator. The regulators in turn have outlet nozzles which are connected to the fittings of flexible hoses, usually of rubber or plastic, and the other ends of these hoses have fittings which are secured to two ends of a torch body. Each of the ends of the torch body connected to the hoses also has a manually controlled valve to control the flow rate of the oxygen and the fuel therethrough with the flow paths of the torch body ends forking together so that the oxygen and fuel are mixed therein in selected proportions.

A torch is fastened to the torch body, typically by being threaded thereon with a nut, and the various valves are operated to produce a desired flow rate and mixture rate of the oxygen and fuel which is emitted from the torch.

A worker typically will begin a work day or a work period by opening a tool and equipment box and removing the oxygen regulator and fuel regulator therefrom and carrying them to the oxygen and fuel cylinders. The regulators are then mounted, one to the nozzle for the oxygen cylinder and the other to the nozzle for the fuel cylinder. The worker also moves the rubber hoses from their storage place to connect them to the regulators and then attaches the torch body and torch to the regulator output hoses.

In the prior art it is known to use a portable cart with a base plate upon which cylinders are mounted, and with cylinder holders to hold the cylinders upright. The cart has had a storage box mounted thereto in which a torch body can be stored, with a slot or passageway in the box wall for allowing the hoses connected to the torch body to extend therethrough so that the hoses remain connected to the stored torch body and to the regulators mounted to the cylinders, with the box having a lid which is locked to prevent removal of the torch body. The slot in the prior art box is sized to prevent passage of the torch body therethrough when the box is locked.

In the prior art, the regulators have been dealt with in basically two ways. In one way, at the end of the work day, or of a work period, the regulators have been left mounted to the cylinder nozzles, in which case they have been stolen, vandalized, or otherwise damaged such as by inadvertent contact. The regulators are particularly susceptible to theft as they are valuable, and a thief can take them and sell them or otherwise transport them so that they can be used anywhere they are desired to be used in other locations. In fact, the regulators are much more susceptible to theft than are the gas cylinders because the cylinders are usually owned by a dealer and have a serial number on them so that if the cylinders are ever refilled, the serial number can be traced back to the legitimate owner of the cylinders or tanks.

The other way of dealing with the regulators has been to detach them from the cylinder nozzles at the end of the work day, and further detach them from the flexible hoses connected thereto, and store them in an equipment and tool box. However, when this is done the worker spends a good bit of time at the end of the day dismantling the regulators from the cylinders, and further dismounting the regulators from the hoses and then carrying or moving the regulators to the equipment or tool box. Then at the beginning of the next work day, or work period, the worker has to again spend time digging the regulators out from the tool and equipment box, possibly banging or scratching the pressure or flow dials in the process, to again move the regulators to the cylinder nozzles and spend the time to re-attach the regulators to the cylinder nozzles. The additional time spent in mounting and dismounting the regulators adds to the cost of any project because of the additional labor cost involved in going through the detaching and re-attaching procedure with the regulators.

SUMMARY OF THE INVENTION

The present invention improves over the prior art. It comprises an assembly which includes a cabinet, which can be mounted to a cylinder cart, or to a truck or other carriage or vehicle. The cabinet has openings therethrough permitting hoses connected to the nozzles of an oxygen cylinder and a fuel cylincylinder to extend inside the cabinet. Inside the cabinet are mounting means for regulators. The regulators have their input ends connected to the hoses coming from the oxygen and fuel tanks, while the output ends of the regulators are connected to output hoses which extend through openings in the cabinet to a position outside the cabinet. The hoses can then wrap around a pair of hose mount tubes, and extend back into the cabinet through an opening to be connected to the ends of a torch body which is mounted such as by spring clamps within the cabinet.

The cabinet can further have a door with a lock which can be opened to allow grasping of the torch body mounted therein so that it can be pulled through the door opening. When the door is locked, the door closes the cabinet so that the regulators are securely mounted within the cabinet against theft.

The regulators are firmly mounted within the cabinet, such as by fittings mounted to cross beams, so that the regulators are always in operable positions, and so they cannot be knocked around within the cabinet if the cabinet is jarred, and so that someone cannot purposely shake them loose. The cabinet further has a sturdy screen to provide ventilation should there be any leakage of oxygen or fuel within the cabinet so that those gases can be dispersed and diluted without causing an explosion should they be ignited within the cabinet. Further, the screen permits the dials for the regulators to be read while the regulators are functioning. The cabinet also has mounting means such as clamps or cross beams with holes therein to mount torches and torch tips.

The regulators in their mounted position within the cabinet can remain in such position day after day and do not need to be dismounted unless some maintenance or repair work needs to be done on them. When that is necessary, one doing such maintenance or repair work can extend his arms and hands into the cabinet and detach the regulators so that they can be moved out of the cabinet through the door opening.

Thus, with the present invention, there is no need for the operator to spend time and effort removing the regulators and their hoses from a storage box and moving them to the cylinders, and then spend the time and effort to mount the regulators to the cylinders, and then later at the end of the day have to take time to dismantle the cylinders and move them again to the storage box. Furthermore, the possibility of the regulators being damaged or disfigured during the removal and replacement into the storage box, and during the moving to and from the cylinders, is eliminated.

Moreover, the owner of the regulators does not need to worry as to whether someone will forget to remove the regulators from the cylinders and store them at the end of the work day or work period, or whether they will remain attached to the cylinders so that they can be stolen or vandalized. Nor does the owner have to make the choice of whether he would rather take the time each day or work period to mount or dismount the regulators, or whether he would rather gamble and leave the regulators mounted thus hoping they will not be damaged or stolen.

Additionally, during actual work, the cabinet encloses the regulators so that objects cannot strike them to damage them or knock them loose from their mountings.

In addition to use for welding and cutting, the invention also has use in supplying oxygen, or other gas, for medical reasons. A cabinet and cart as well can be used in a hospital or doctor's office where it is necessary to provide oxygen or a gas to a patient. For example, instead of the oxygen hose extending from a regulator to a torch body, the hose would extend to connection with a nose and mouth mask for a patient, or to an oxygen tent.

Another feature of the overall structure is that the cabinet is mounted to the cart in such a way that the cabinet itself acts as a barrier to block objects from striking the cylinder valves at the top of the cylinders to either damage them or to inadvertently open or close those valves.

A slidable rod is detachably mounted to the cart so that the rod rotates relative to the cart. The rod is secured by means which permits such rotational movement but prevents the rod from being disengaged from its lifting eye as the cart rotates relative to the eye.

DESCRIPTION OF THE PREFERRED EMBODIMENT

Referring to the drawings, the cabinet 20 is shown mounted to a cylinder cart 22. First a description of the cart 22 shall be given. Cart 22 comprises an inverted U-shaped tubular central brace 25 having an upper horizontal section 27 which extends downwardly into a pair of legs 29. Cart 22 further comprises a bent tubular U-brace 31 having a horizontal section 33, which serves as a cart handle, that extends horizontally into a pair of sections 35 which are welded to legs 29 at their points of intersection, with the sections 35 being bent at an angle downwardly into a pair of thigh sections 37, which likewise bend downwardly into vertical calf section 39. The bottom of the legs 29 and the calf sections 39 all have crimped feet 40 resting against the floor 41.

A horizontal base plate 43 has its four corners welded to the lower ends of the legs 29 and calves 39, and further has a rear depending flange 45 having its ends welded to the feet 40 of calves 39, and an upright stop flange 46 having ends welded to legs 29 just above feet 40. The braces 25 and 31 are further connected by a pair of parallel horizontal cross beams 47 each having their ends welded to the upper parts of calves 39 and to the midpart of legs 29. A horizontal cross brace 50 has its ends welded to the insides of the legs 29 adjacent the connections to braces 47. A pair of curved hose support tubes 51 have their inner ends welded to the front side of brace 50, and their exterior ends covered by rubber caps 52. A lower horizontal cross brace 53 also has its ends welded to the insides of legs 29.

On the lower front sides of legs 29 are welded the rear edges of plates 54 which have aligned holes through which the ends of an axle 56 pass to be centrally mounted to rubber wheels 59.

Horizontal flanges 62, 64 and 66 each have their longer edges welded to the rears of horizontal braces 27, 50 and 53 respectively and further have aligned bores through which a vertical lifting rod 69 slidingly extends. The top of rod 69 is threaded to receive an eyelet nut 70 which rests against the upper surface of flange 62, with a cotter pin 71 passing through rod 69 to prevent eyelet 70 from being unscrewed. The lower end of rod 69 slidingly passes through an aligned bore in base 43, thence through washer 72, and has its tip threaded to receive a lock nut 73 with a cotter pin 77 passing through bores in nut 73 and rod 69 to hold nut 73 thereto.

Figures 1, 4, 8:
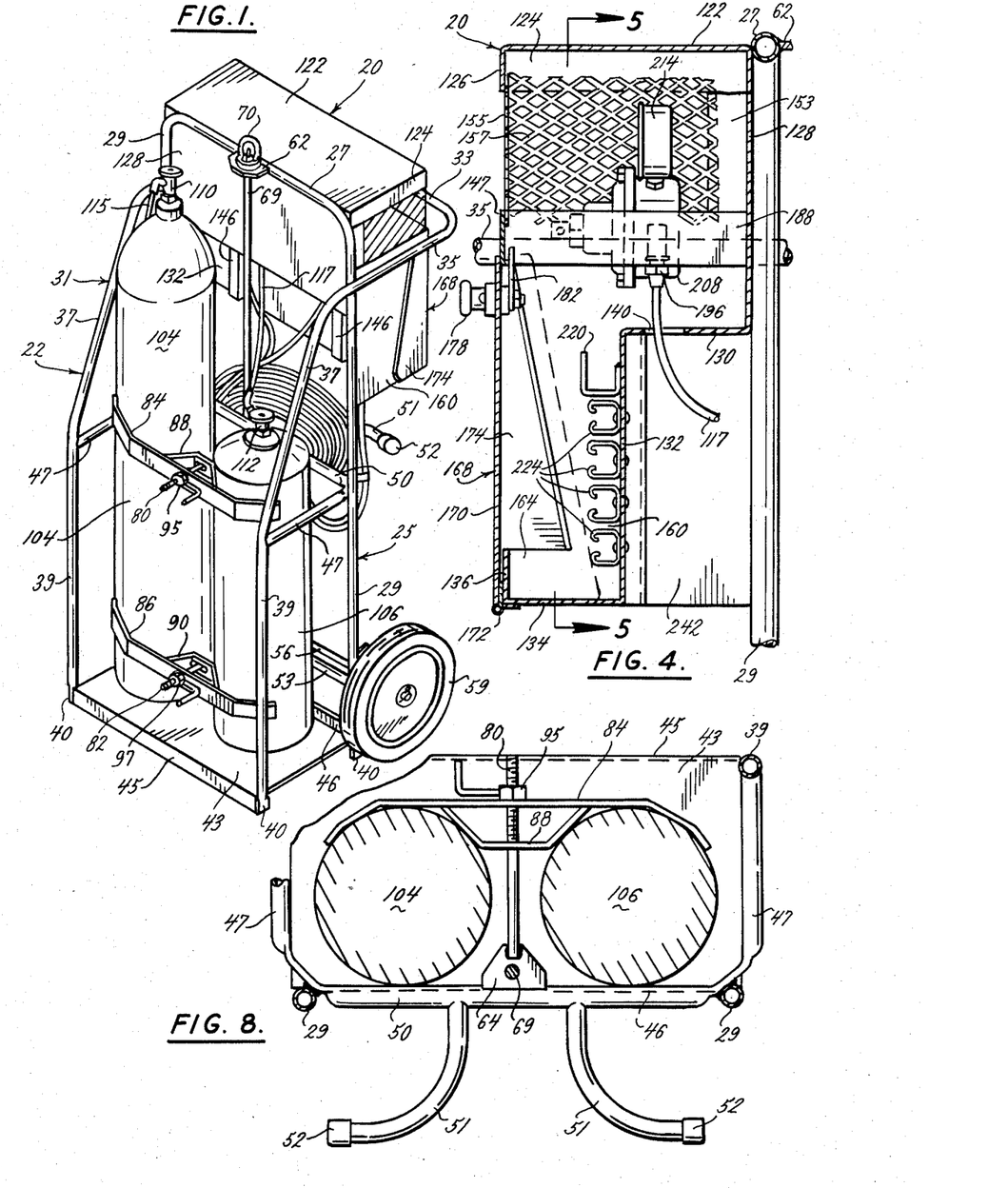
FIG. 1 is an orthogonal projection of the cabinet shown mounted to the cylinder cart.
FIG. 4 is a section of the cabinet taken on the line 4—4 of FIG. 3.
FIG. 8 is a section taken on the line 8—8 of FIG. 3.

The tops of flanges 64 and 66 each have the lower side of an end of horizontal rods 80 and 82, respectively, welded thereto, as seen more clearly in FIG. 8 for rod 80. A pair of standard cylinder holder braces 84 and 86 each have their ends angled inwardly and have central trapezoidal shaped bridges 88 and 90 respectively mounted thereto, so that the rods 80 and 82 pass through openings in the bridges 88 and 90, and braces 84 and 86, respectively, with torque handled nuts 95 and 97 fastened to the threaded ends of rods 80 and 82, so that the braces 84 and 86 press against an oxygen cylinder 104 and a fuel cylinder 106 for fuel such as acetylene, propane, propylene, or mapp. The bottoms of cylinders 104 and 106 rest upon base plate 43, and their front sides rest against the upright base flange 46 and cross braces 53 and 50.

Figures 2, 7:
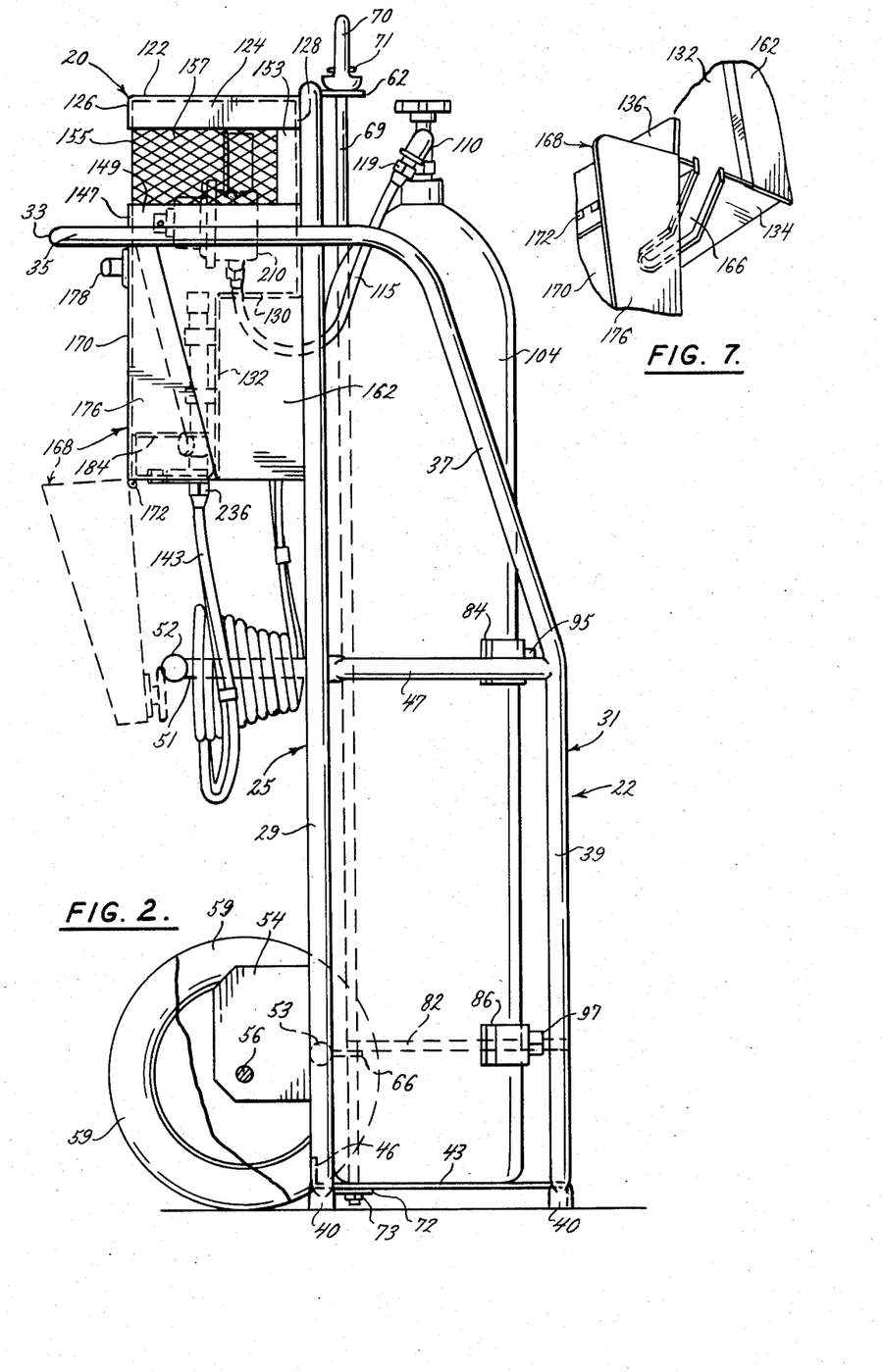
FIG. 2 is a side view of the cabinet mounted to the cart, with the cabinet door shown in hidden lines.
FIG. 7 is an orthogonal projection of a lower corner of the cabinet showing the slot for allowing passage of hoses to the torch body, with the hoses and torch body not shown.
Figure 3:
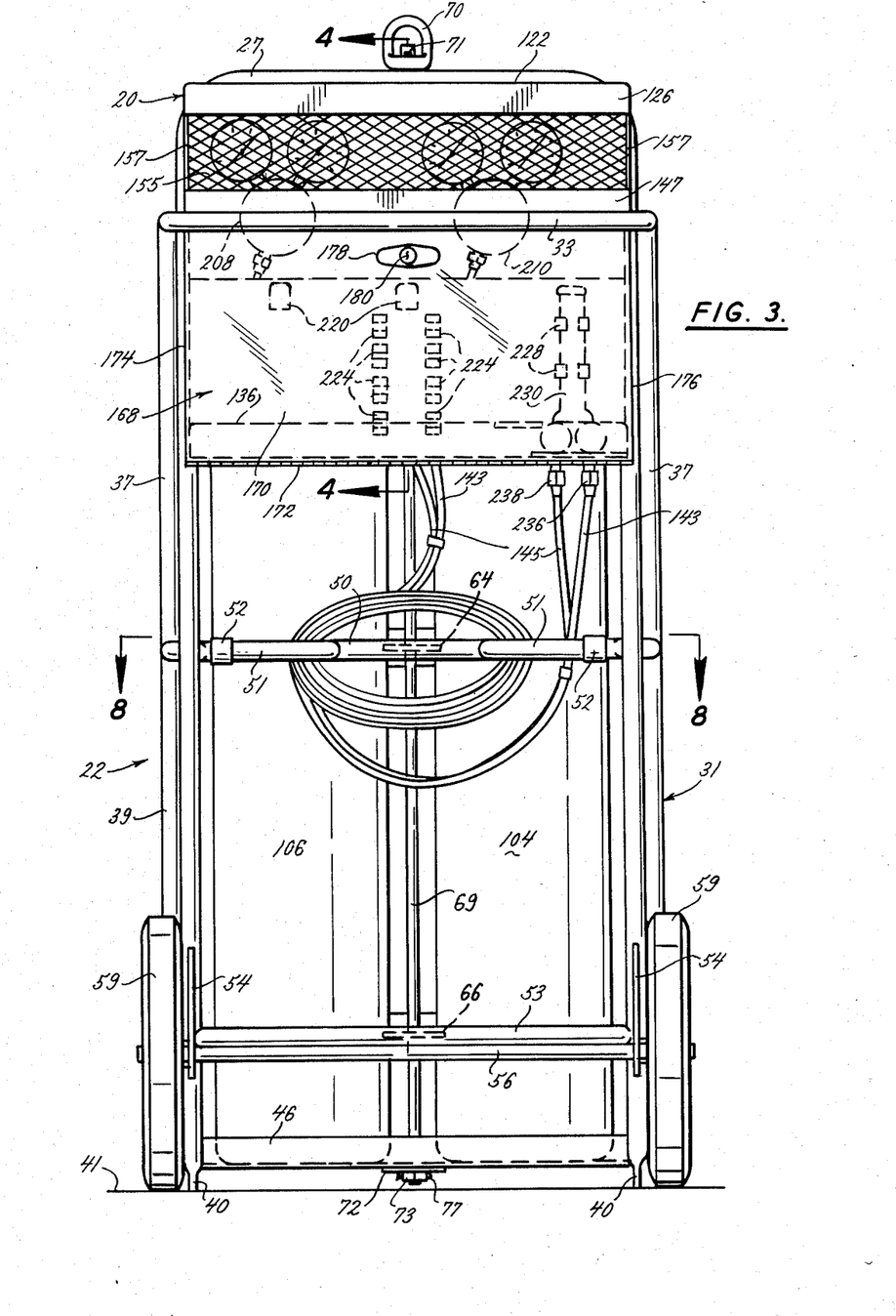
FIG. 3 is a front view of the cabinet mounted on the cart.

Cylinders 104 and 106 each have at their tops, as is known in the art, manually controlled valves 110 and 112, each with nozzles to which flexible metal hoses 115 and 117 can be securely fastened as by nuts such as 119 shown in FIG. 2. Each of the hoses 115 and 117 extends into the cabinet 20 to be in connection with regulators as will be later described.

The cabinet 20 has a top, a rear and a bottom that can be formed of one continuous piece of metal. The top 122 can be stamped so that it has two continuous depending side flaps 124 as well as a continuous depending front flap 126 whose ends are welded to the front ends of flaps 124. The rear of top 122 depends vertically into an upper rear wall 128 and then bends forwardly into a ledge 130 and thence bends vertically into a lower wall 132 which bends forwardly into a floor 134 that extends into an upright lip 136. The ledge 130 has two oblong-shaped holes 138 and 140 (FIG. 6) which receive rubber hoses 143 and 145, respectively, which are connected to regulators as will be described, and hole 140 likewise receives metal hose 117. Ledge 130 also has a circular hole 144 through which metal hose 115 extends. A pair of channels 146 can be welded to the exterior of rear cabinet wall 132 to provide extra rigidity.

Cabinet 20 is further formed by a front steel band 147 which bends into two parallel side bands 149, the rear ends of which are welded to the side edges of back section 128. A pair of vertical steel bands 153 have their ends welded to the bottom rear edges of side flaps 124 and to the upper rear edges of side bands 149.

A sturdy metal screen front 155 and its two parallel sides 157 have their top edges spot welded to the interior of front flap 126 and side flaps 124, respectively, and their bottom edges spot welded to the insides of the front band 147 and side bands 149. The rear edges of the screen sides 157 are spot welded to the insides of the vertical bands 153. The screen front 155 and sides 157 are thus sturdily mounted to withstand intrusion into the cabinet 20 but the screen openings provide adequate ventilation for the cabinet 20.

Cabinet 20 is additionally formed by trapezoid side sections 160 and 162 which have their upper ends welded to the bottom of side bands 149 and the upper part of their rear edges welded to the rear cabinet wall 128, while the front parts of their bottom edges are welded to cabinet floor 134. The front ends of trapezoids 160 and 162 are curved inwardly for approximately one-half inch to match the curvature of side bands 149 into front band 147.

The trapezoid 160 differs somewhat from trapezoid 162 in that it has a rectangular foot 164 which has its bottom edge welded to cabinet floor 134 and its curved front edge welded to the adjacent end of upright lip 136 to close off the left lower end of cabinet 20.

As seen more clearly in FIG. 7, the right side (as viewed looking at FIGS. 5 and 6) of cabinet floor 134 has an L-shaped slot 166 formed therein to allow passage of the hoses 143 and 145 to permit attachment to a torch body to be described.

A cabinet door 168 has a front wall 170 whose lower end is hinged at 172 to the front edge of cabinet floor 134, and further has parallel sides 174 and 176 that project, in the closed position, so that the rears of their interior sides fit closely against the front sides of trapezoids 160 and 162 to provide an effective security seal to prevent a hand or other intrusion means from penetrating into the interior of the cabinet 20. Door 168 further has a lock handle 178 with a key hole 180, with handle 178 having a standard locking mechanism for engaging a catch 182 which is mounted to the interior lip of frontal band 147 as seen in FIG. 4, so that the lock handle 180 can be activated to be securely engaged with catch 182 to prevent opening of the door 168 and further so that a key (not shown) can be used to disengage the lock handle 180 from the catch 182 to allow the door 168 to swing downwardly open into the position shown in dashed lines in FIG. 2 to allow access into the cabinet 20.

On the inside of cabinet 20 there is a horizontal torch tip support strip 184 having its front and rear ends welded to upright lip 136 and cabinet wall 132, respectively, the strip 184 having cylindrical bores for mounting a plurality of torch tips 186. A pair of regulator support beams 188 and 190 have their front edges welded to front cabinet band 147 and their rear edges welded to rear cabinet wall 128. The beams 188 and 190 have bores therethrough, with elbow couplings 192 and 194 having their lower ends connected by nuts 196 and 198 to the metal hoses 117 and 115, respectively, and their upper ends adjacent beams 188 and 190 with another set of couplings 200 and 202 having ends extending through bores in beams 188 and 190 into threaded connection with the upper ends of couplings 192 and 194 with the inter-connection between the said couplings being such that each pair of couplings 192 and 200, and 194 and 202, are firmly mounted against the respective beams 188 and 190 so that they do not wobble, and so that metal input tubes 204 and 206 can be mounted to couplings 200 and 202 to rigidly connect them to standard control valve regulators 208 and 210. Each regulator 208 and 210 comprises a pressure dial 212 and flow rate dial 214.

The bottom of the regulators 208 and 210 each have threaded fittings to which the nuts 216 and 218 at the ends of hoses 145 and 143 are attached.

Figures 5, 6:
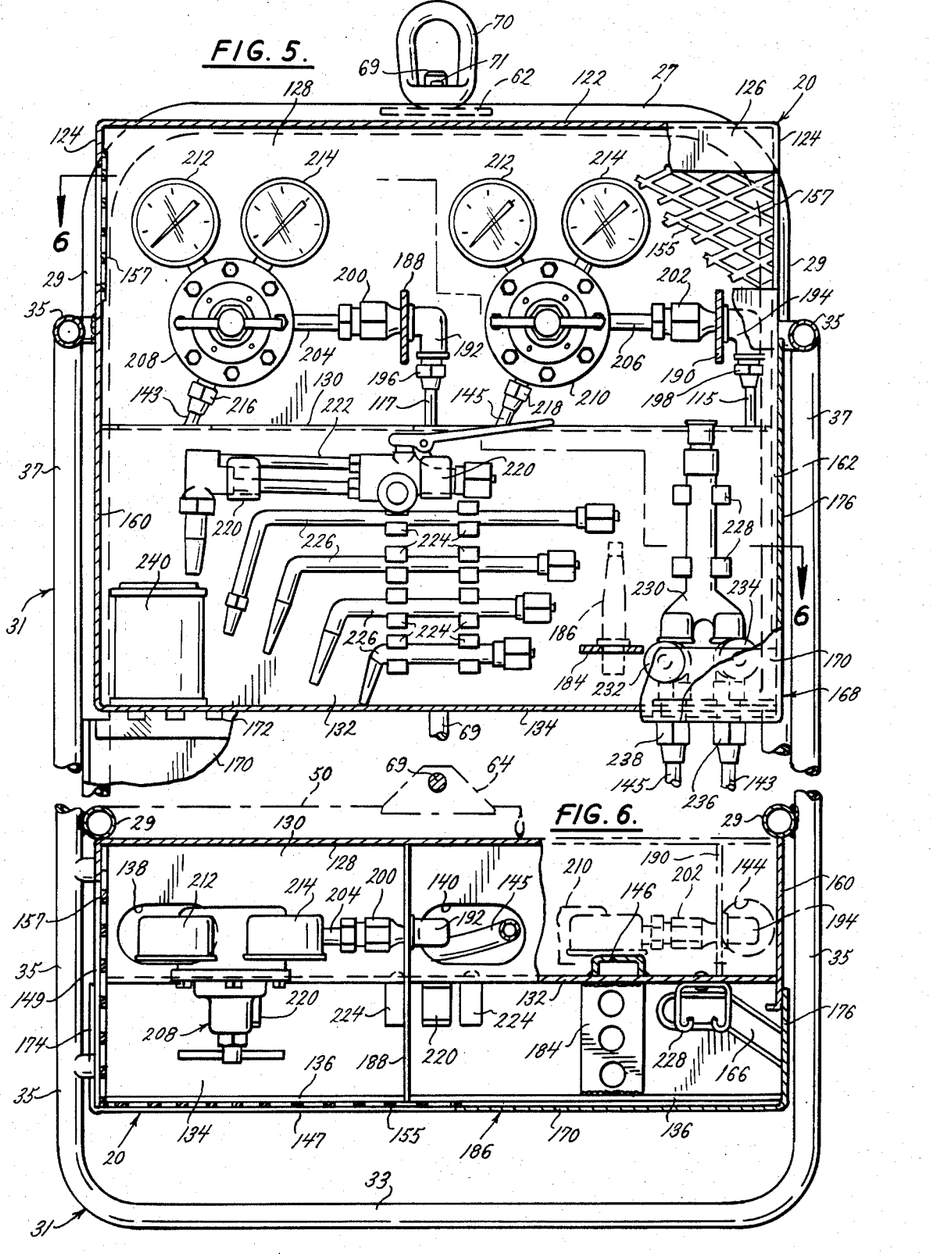
FIG. 5 is a section taken on the line 5—5 of FIG. 4 showing the interior of the cabinet, with some parts being shown broken.
FIG. 6 is a stepped section taken on the line 6—6 of FIG. 5.

Welded to the front side of the rear cabinet wall 132 are a pair of metal J brackets 220 for mounting a large torch 222 as shown in FIG. 5, while therebeneath are mounted, as by rivets, four rows of C-shaped spring clamps 224 for horizontally mounting a plurality of torches 226. To the right of the torches 226 and torch tip support 184 are a pair of spring C clamps 228 which mount a standard torch body 230. Torch body 230 has a pair of standard manual input valves 232 and 234 which are connected as is known in the art to the fittings 236 and 238 at the ends of hoses 143 and 145. It is thus seen that tanks 104 and 106 are connected to torch body 230. Additionally, the cabinet 20 can store other items such as a flux can 240.

The cabinet 20 thus has a lower rear recess cavity 242 formed by the lower rear wall 132, ledge 130 and portions of the trapezoids 160 and 162 through which the hoses 115, 117, 143 and 145 extend.

The cabinet 20 is secured to the cart 22 by central brace section 27 being welded to back wall 128 and the upper ends of legs 29 being welded to the sides of back wall 128 with the legs 29 further being welded to the rear edges of vertical bands 153 and trapezoids 160 and 162. Further, the horizontal sections 35 of brace 31 are welded to bands 149.

The hoses 115, 116, 143 and 145 can, if desired, all extend through a single hole in the cabinet, such as hole 140. Furtner, the reentry of the hoses 143 and 145 and their fittings 236 and 238 back in the cabinet 20 could be through the same hole 140, with the clamps 228 being mounted higher for the torch body 230 to allow for more room. However, the spacing of the holes 138, 140, 144 and 166 allows for less congestion of the hoses 115, 117, 143 and 145 within the cabinet 20, and easier installation of hoses 115, 117, 143 and 145.

OPERATION

In operation, the regulators 208 and 210 are mounted rigidly within cabinet 20 connected to the input hoses 117 and 115 and to output hoses 143 and 145. With the door 168 in the locked position, the regulators 208 and 210, including their dials 212 and 214, are protected from theft although they remain in an operable mode. When it is desired to use a torch, the door 168 can be opened to the dashed line position of FIG. 2 and the hand can grasp the torch body 230 and pull it away from its clamps 228, and one of the 30 torches such as torch 222 can be attached as known in the art to the torch body 230 for operation.

The cylinder valves 110 and 112 can then be moved to a desired position to permit flow into metal hoses 115 and 117, and the valves of regulators 208 and 210 can be adjusted for the desired amount of flow through hoses 143 and 145. The rubber hoses 143 and 145 can then be pulled around the hose supports 51 to give the desired amount of slack, and the torch body 230 can then be grasped by the hand and pulled out of the opening of door 170 to a desired location with the hoses 143 and 145 being pulled upwardly through the slot 166 as the torch body 230 is pulled. The operator then adjusts the torch body valves 232 and 234 to obtain the desired flow and mixture of oxygen and fuel and performs whatever job is necessary at the location.

The operator, having finished that job can then shut the torch body valves 232 and 234 and move to a different location and then again adjust the valves 232 and 234 and perform other work. When desired, the operator can return to the cabinet 20 to replace the torch 222 with another torch 226. The operator can also select a different replacement torch tip 186 to use.

During the entire time throughout the working day, the regulators 208 and 210 and their gauges remain inside cabinet 20 mounted in their fixed position as shown in the drawings.

At the end of the working day, or other work period, the operator can shut valves 232 and 234, move the torch body 230 back to cabinet 20 and disconnect the torch 222 or 226 therefrom, and then pull the hoses 143 and 145 downwardly through slot 166 until the hose fittings 236 and 238 are just beneath cabinet floor 134 so that the torch body 230 can be mounted to clamps 228. The slot 116 is sized to be small enough to prevent passage of the torch body 230 so that it cannot inadvertently or purposely be pulled through slot 166. The cylinder valves 110 and 112 and regulators 208 and 210 can be closed.

After all the desired articles are placed within cabinet 20, the cabinet door 168 can be closed and locked with the regulators 208 and 210 in the same functional position as shown in FIG. 5. In this way, it is unnecessary for a worker to spend valuable time during the working day mounting and dismounting the regulators 208 and 210 to and from cylinders which not only saves valuable work time, but also eliminates the likelihood that the regulators 208 and 210 could be damaged by dropping them and further insures that a worker through a lackadaisical attitude or forgetfulness, will not leave the regulators 208 and 210 in locations where they can be stolen, vandalized, forgotten, or harmed. Additionally, the owner need not make a choice between taking the time to mount and dismount the regulators 208 and 210 for each period, or trying to save time by leaving the regulators 208 and 210 mounted and gambling that they will not be damaged or stolen.

Moreover, by maintaining the regulators 208 and 210 inside the enclosed structure of the cabinet 20, they are prevented from being injured or knocked out of engagement with the cylinders 104 or 106, by any falling or moving objects in the work area.

The ventilation screens 155 and 157 permit air flow through the cabinet 20 so that any oxygen or fuel leaking into the cabinet will be dispersed and diluted so that an explosion is avoided. The screens 155 and 157 further permit viewing of the dials 212 and 214 during operation, and also allow viewing of other objects within cabinet 20 when the door 168 is locked.

In addition to the time and labor saved in not having to mount and dismount the regulators 208 and 210, at the beginning and end of the work day, or during any other time period when the cylinders 104 and 106 are not put to use, there is further elimination of the need to dig through a tool and equipment box to haul out the regulators 208 and 210 which thus also eliminates the possibility of their being scratched and damaged during such a process.

Maintenance on the regulators 208 and 210 can be performed with ease, as the door 168 can be opened and the arms and hands extended through the opening so that maintenance can be performed on the regulators 208 and 210, and if necessary the fittings 192 and 200, and 194 and 206 can be disengaged from each other and from the mounting beams 188 and 190, and the regulators 208 and 210 can be removed from the cabinet so that maintenance can be performed, or so the regulators 208 and 210 can be moved to such other location as may be desired.

The openings 138, 140 and 144 are large enough to permit passage of their respective hoses, but are small enough to prevent passage of either regulator 208 or 210 therethrough.

The cabinet 20 further acts as a barrier in front of cylinders 104 and 106 to block the valves 110 and 112 from being struck by objects to damage them or to knock them loose from cylinders 104 and 106, or to open or close valves 110 or 112 inadvertently.

The cabinet 20 has been shown as being mounted to the cart 22, though cabinet 20 can also be mounted to another carriage arrangement or to vehicles such as trucks or automobiles.

The removable rod 69 provides ease in assembly for the assembly, and rod 69 and lifting eye 70 prevent the rest of cart 22 from being unscrewed from eye 70 during possible spinning of the cart 22 when the eye 70 and cart 22 are lifted as by a crane.

The invention also has use in the medical supply of oxygen or other gas. The cabinet 20 and cart 22 can be used in a hospital or doctor's office to provide oxygen or some other gas to a patient. For example, the oxygen hose 145 can extend to connection with a nose and mouth mask for a patient, or to an oxygen tent. The cabinet 20 and cart 22 would also offer the previously discussed advantages in a hospital or medical environment.

The openings in the cabinet 20 can, in lieu of having the separate screen front 155 and sides 157, be formed by having the front flap 126 unitary with the front band 147 and with the vertical bands 153, as well as having side bands 149 unitary with the side flaps 124 and with the vertical bands 153, so that the openings for the screen can be punched in the said unitary sheet to provide openings in the areas shown for screen sections 155 and 157.

The cabinet 20 can be reduced in size to accommodate a single regulator and its incoming and outgoing hoses, or can be enlarged to accommodate three or more regulators and their corresponding incoming and outgoing hoses.

The cabinet 20 and cart 22 can be of different sizes to accommodate oxygen cylinders and fuel cylinders of different dimensions than shown for cylinders 104 and 106 while achieving the same benefits and advantages of the invention which have been discussed.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What I claim is

1. A structure for oxygen-fuel welding and cutting use and medical use, to be used with a cylinder with a valve, hoses, and regulator, comprising:
   (a) a cabinet having walls forming an enclosure with an opening for a door, the said opening sized to permit the hands to extend within the cabinet, and to permit passage of a regulator therethrough;
   (b) a door movably mounted to the cabinet with means for moving from an open position which allows the said opening to be exposed to permit a regulator and the hands to extend therethrough, and to a closed position which blocks the said opening to prevent the hands or fingers from extending into the opening and prevents removal of the regulator from the cabinet;
   (c) means for rigidly mounting a regulator within the cabinet;
   (d) the cabinet having means for allowing an input hose to extend from a cylinder valve to connection with a regulator mounted within the cabinet and for allowing an output hose to extend from the regulator to outside the cabinet, the said means being sized to permit the passage of the input and output hoses but to block the passage of the regulator therethrough.

2. The structure of claim 1 further comprising the cabinet having means for allowing the output hose to further extend into the cabinet for connection to a device within the cabinet.

3. The structure of claim 1 further comprising the cabinet having a screened section permitting ventilation of gas within the cabinet.

4. The structure of claim 1 wherein the cabinet has means for permitting viewing of the regulators within the cabinet from a vantage point outside the cabinet.

5. The structure of claim 3 wherein the screened section is positioned on the cabinet to permit one located outside the cabinet to view the regulators mounted inside the cabinet.

6. The structure of claim 1 wherein the means to mount the regulator comprises a beam mounted to cabinet walls.

7. The structure of claim 1 further comprising a portable cart, the cabinet being mounted to the cart at a height to act to obstruct objects from moving into contact with the valve on the cylinder.

8. The structure of claim 7 further comprising a detachable mounting rod having means for being mounted to the cart to rotate relative to the cart and a lifting eye having means for being mounted thereto so that the eye is not disengaged from the cart during rotation of the cart relative to the rod.

9. A structure for oxygen-fuel welding and cutting use which can be used with an oxygen cylinder having a valve and a fuel cylinder having a valve, first and second regulators having inputs and outputs and dials, torch bodies, torches, and first and second hoses extending from a first oxygen cylinder and a second gas cylinder, respectively, and third and fourth hoses extending from the outputs for the first and second regulators to the torch body, comprising:
   (a) a cabinet having walls forming an enclosure with an opening for a door, the said opening sized to permit the hands to extend therein, and to permit passage of a regulator therethrough;
   (b) a door mounted to the cabinet with means to be movable from an open position which allows the said opening to be exposed to permit a regulator and a hand to pass therethrough, and to a closed position which blocks the said opening to prevent the hand or fingers from extending into the opening and prevents removal of the regulator therethrough;
   (c) means for sturdily mounting first and second regulators within the walls of the cabinet;
   (d) the cabinet having means for allowing the first and second hoses to extend from the valves for the oxygen and fuel cylinders, respectively, into the cabinet and be mounted to the inputs for the first and second regulators, respectively, and for allowing the third and fourth hoses to extend from their connections to the first and second regulators, respectively, within the cabinet to outside the cabinet, the said means being sized to permit the passage of the first, second, third and fourth hoses therethrough but to block passage of a regulator therethrough.

10. The structure of claim 9 further comprising the cabinet having means for allowing the third and fourth hoses to extend from outside the cabinet to reenter inside the cabinet for connection to the torch body.

11. The structure of claim 9 further comprising the cabinet having a screened section permitting ventilation of gas within the cabinet.

12. The structure of claim 9 wherein the cabinet has means for permitting viewing of the regulator dials within the cabinet from a vantage point outside the cabinet.

13. The structure of claim 9 wherein the screened section is positioned on the cabinet to permit one located outside the cabinet to view the regulator dials mounted inside the cabinet.

14. The structure of claim 9 wherein the means for mounting the regulators comprise at least one beam mounted to the cabinet.

15. The structure of claim 9 wherein the means to mount the regulators comprises a beam mounted to the cabinet, the beam having an opening therethrough for receiving fittings for the regulator.

16. The structure of claim 9 further comprising a portable cart, the cabinet being mounted to the cart at a height to act to obstruct objects from moving into contact with the valves on the cylinders.

17. The structure of claim 9 wherein the means for allowing the first and second hoses to extend from their respective cylinders into the cabinet comprises the cabinet having two separate holes, and wherein the means for allowing the third and fourth hoses to extend outside the cabinet comprises the cabinet having two separate holes.

18. The structure of claim 18 further comprising the cabinet having a hole for allowing the third and fourth hoses to extend from outside the cabinet to reenter inside the cabinet for connection to the torch body, said hole being separate from the aforementioned holes.

19. The structure of claim 16 further comprising a detachable mounting rod having means for being mounted to the cart to rotate relative to the cart and a lifting eye having means for being mounted thereto so that the eye is not disengaged from the cart during rotation of the cart relative to the rod.

20. An assembly for oxygen-fuel welding and cutting comprising:
  (a) first and second cylinders, each cylinder having a discharge valve;
  (b) first and second regulators, each having an input and an output;
  (c) a cabinet having walls forming an enclosure with an opening for a door, the said opening being sized to permit a hand to extend therein, and to permit passage of a regulator therethrough;
  (d) a door mounted to the cabinet with means for moving from an open position which allows the said opening to be exposed to permit a regulator and a hand to pass therethrough, and to a closed position which blocks the said opening to prevent the hand or fingers from extending into the opening and prevent removal of a regulator therethrough;
  (e) means for sturdily mounting the first and second regulators within the cabinet;
  (f) first and second hoses for connecting the valves of the first and second cylinders to the inputs of the first and second regulators, respectively;
  (g) third and fourth hoses for connection to the outputs of the first and second regulators, respectively, and for extending therefrom to positions outside the cabinet; and
  (h) the cabinet having means for allowing the first and second hoses to extend from the first and second cylinder valves, respectively, into the cabinet and for allowing the third and fourth hoses to extend from within the cabinet to outside the cabinet, the said means being sized to permit the passage of the first, second, third and fourth hoses therethrough but to block passage of a regulator therethrough.

21. The assembly of claim 20 further comprising a torch body and a portable cart having hose mounting means with the third and fourth hoses extending from their connections to the first and second regulators, respectively, inside the cabinet to extend outside the cabinet about the hose mounting means and thence back into the cabinet for connection to a torch body, and further comprising the cabinet having means for allowing passage of the third and fourth hoses from the hose mounting means into the cabinet.

22. The structure of claim 20 wherein the means for mounting the first and second regulators comprise first and second beams mounted within the cabinet, the first beam and second beam each having an opening for receiving fittings of the first and second regulators, respectively.

23. The structure of claim 20 further comprising the cabinet having a screened section permitting ventilation of gas within the cabinet, the screened section being located to permit one positioned outside the cabinet to view the first and second regulators.

* * * * *

UNITED STATES PATENT OFFICE
CERTIFICATE OF CORRECTION

Patent No. 4,625,949     Dated December 2, 1986

Inventor(s) James A. Walker

It is certified that error appears in the above-identified patent and that said Letters Patent are hereby corrected as shown below:

In the Specification: Column 5, line 59, delete "L-shaped".

In the Claims:
Column 9, line 30, delete "a", and after "door" insert --structure--.

Column 9, line 33, delete "a", and after "door" insert --structure--.

Column 9, line 38, delete "or fingers".

Column 10, line 15, insert --a-- before "torch" and change "bodies" to --body--.

Column 10, line 22, delete "a", and insert --structure-- after "door".

Column 10, line 29, delete "or fingers".

Column 10, line 49, change the "." to a --,-- and add thereafter --the said means being sized to prevent passage of the torch body therethrough.--

Column 11, line 16, after "holes" insert --and being sized to prevent passage of the torch body therethrough--.

Column 11, line 30, delete "a", and insert --structure-- after "door".

Column 11, line 34, delete "a", and insert --structure-- after "door".

UNITED STATES PATENT AND TRADEMARK OFFICE
CERTIFICATE OF CORRECTION

PATENT NO. : 4,625,949

DATED : December 2, 1986

INVENTOR(S) : James A. Walker

It is certified that error appears in the above-identified patent and that said Letters Patent is hereby corrected as shown below:

Column 11, line 39, delete "or fingers".

Signed and Sealed this

Seventeenth Day of March, 1987

Attest:

DONALD J. QUIGG

Attesting Officer

Commissioner of Patents and Trademarks